US008959643B1

(12) United States Patent
Invernizzi et al.

(10) Patent No.: US 8,959,643 B1
(45) Date of Patent: Feb. 17, 2015

(54) DETECTING MALWARE INFESTATIONS IN LARGE-SCALE NETWORKS

(71) Applicant: Narus, Inc., Sunnyvale, CA (US)

(72) Inventors: Luca Invernizzi, Goleta, CA (US); Stanislav Miskovic, San Jose, CA (US); Ruben Torres, Sunnyvale, CA (US); Sabyasachi Saha, Sunnyvale, CA (US); Christopher Kruegel, Santa Barbara, CA (US); Antonio Nucci, San Jose, CA (US); Sung-Ju Lee, Redwood City, CA (US); Giovanni Vigna, Santa Barbara, CA (US)

(73) Assignee: Narus, Inc., Sunnyvale, CA (US)

( * ) Notice: Subject to any disclaimer, the term of this patent is extended or adjusted under 35 U.S.C. 154(b) by 6 days.

(21) Appl. No.: 13/963,958

(22) Filed: Aug. 9, 2013

(51) Int. Cl.
*G06F 11/00* (2006.01)
*H04L 29/06* (2006.01)
*G06F 21/56* (2013.01)

(52) U.S. Cl.
CPC .......... *H04L 63/1441* (2013.01); *H04L 63/145* (2013.01); *H04L 63/1408* (2013.01); *G06F 21/566* (2013.01)
USPC ................. 726/24; 726/23; 726/25; 713/187; 713/188

(58) Field of Classification Search
CPC .............. H04L 63/1441; H04L 63/145; H04L 63/1408; H04L 63/0263; G06F 21/566
See application file for complete search history.

(56) References Cited

U.S. PATENT DOCUMENTS

2012/0084860 A1* 4/2012 Cao et al. .................. 726/23
2012/0304244 A1* 11/2012 Xie et al. ................... 726/1

OTHER PUBLICATIONS

Zhang et al., "ARROW: Generating Signatures to Detect Drive-By Downloads", ACM, Apr. 11, 2013, pp. 1-10.*
Zhang, J., et al., "ARROW: Generating Signatures to Detect Drive-By Downloads," in International World Wide Web Conference (WWW), Mar. 28-Apr. 1, 2011.
Oberheidi, J., et al., "CloudAV: N-Version Antivirus in The Network Cloud," in USENIX Security Symposium, Jul. 28-Aug. 1, 2008.
Rajab, M., et al., "CAMP: Content-Agnostic Malware Protection," in Network and Distributed Systems Security Symposium (NDSS), Feb. 24-27, 2013.

* cited by examiner

*Primary Examiner* — Shewaye Gelagay
(74) *Attorney, Agent, or Firm* — Fernandez & Associates, LLP (57) ABSTRACT

A method for detecting a malicious activity in a network. The method includes obtaining file download flows from the network, analyzing, the file download flows to generate malicious indications using a pre-determined malicious behavior detection algorithm, extracting a file download attribute from a suspicious file download flow of a malicious indication, wherein the file download attribute represents one or more of the URL, the FQDN, the top-level domain name, the URL path, the URL file name, and the payload of the suspicious file download flow, determining the file download attribute as being shared by at least two suspicious file download flows, identifying related suspicious file download flows and determining a level of association between based at least on the file download attribute, computing a malicious score of the suspicious file download flow based on the level of association, and presenting the malicious score to an analyst user of the network.

9 Claims, 8 Drawing Sheets

DETECTING MALWARE INFESTATIONS IN LARGE-SCALE NETWORKS

BACKGROUND OF THE INVENTION

"Malware" is a general term used to refer to a variety of forms of hostile or intrusive software. Malware is typically used or programmed by attackers to disrupt computer operation, gather sensitive information, or gain access to private computer systems. Malware is typically distributed by downloading the malware executable file onto a networked computer, which then becomes infected. As cyber crime continues to spread, malware distributors become increasingly savvy in disguising their activities. Unfortunately, common defenses based on blacklisting and malware signatures can be easily bypassed.

SUMMARY

In general, in one aspect, the present invention relates to a method for detecting a malicious activity in a network. The method includes obtaining a plurality of file download flows from the network, wherein each of the plurality of file download flows comprises a payload that is downloaded from a server to a client and is identified by a uniform resource locator (URL), wherein the URL comprises a fully qualified domain name (FQDN) concatenated with a URL path, wherein the FQDN comprises a top level domain name, and wherein the URL path comprises a URL file name, analyzing, by a computer processor and using a pre-determined malicious behavior detection algorithm, the plurality of file download flows to generate a plurality of malicious indications, wherein each of the plurality of malicious indications corresponds to at least one suspicious file download flow identified from the plurality of file download flows, extracting a file download attribute from a suspicious file download flow of the plurality of file download flows, wherein the suspicious file download flow corresponds to a malicious indication of the plurality of malicious indications, wherein the file download attribute represents at least one selected from a group consisting of the URL, the FQDN, the top-level domain name, the URL path, the URL file name, and the payload of the suspicious file download flow, determining the file download attribute as being shared by at least two suspicious file download flows corresponding to at least two of the plurality of malicious indications, identifying, in response to the determining and based at least on the file download attribute, a plurality of related suspicious file download flows associated with the suspicious file download flow, determining, in response to the identifying and based at least on the file download attribute, a level of association between the suspicious file download flow and the plurality of related suspicious file download flows, computing, by the computer processor and using a pre-determined malicious score calculation algorithm, a malicious score of the suspicious file download flow based on the level of association, and presenting the malicious score to an analyst user of the network.

In general, in one aspect, the present invention relates to a system for detecting a malicious activity in a network. The system includes (1) a processor, (2) memory storing instructions executable by the processor, where the instructions includes (i) a malicious behavior detector configured to obtain a plurality of file download flows from the network, wherein each of the plurality of file download flows comprises a payload that is downloaded from a server to a client and is identified by a uniform resource locator (URL), wherein the URL comprises a fully qualified domain name (FQDN) concatenated with a URL path, wherein the FQDN comprises a top level domain name, and wherein the URL path comprises a URL file name, and analyze, using a pre-determined malicious behavior detection algorithm, the plurality of file download flows to generate a plurality of malicious indications, wherein each of the plurality of malicious indications corresponds to at least one suspicious file download flow identified from the plurality of file download flows, (ii) a malicious indication analyzer configured to extract a file download attribute from a suspicious file download flow of the plurality of file download flows, wherein the suspicious file download flow corresponds to a malicious indication of the plurality of malicious indications, wherein the file download attribute represents at least one selected from a group consisting of the URL, the FQDN, the top-level domain name, the URL path, the URL file name, and the payload of the suspicious file download flow, determine the file download attribute as being shared by at least two suspicious file download flows corresponding to at least two of the plurality of malicious indications, identify, in response to the determining and based at least on the file download attribute, a plurality of related suspicious file download flows associated with the suspicious file download flow, and determine, in response to the identifying and based at least on the file download attribute, a level of association between the suspicious file download flow and the plurality of related suspicious file download flows, and (iii) a malicious score calculator configured to compute, using a pre-determined malicious score calculation algorithm, a malicious score of the suspicious file download flow based on the level of association, and (3) a repository configured to store the plurality of malicious indications.

In general, in one aspect, the present invention relates to a computer readable medium embodying instructions for detecting a malicious activity in a network. The instructions, when executed by a processor, include functionality for obtaining a plurality of file download flows from the network, wherein each of the plurality of file download flows comprises a payload that is downloaded from a server to a client and is identified by a uniform resource locator (URL), wherein the URL comprises a fully qualified domain name (FQDN) concatenated with a URL path, wherein the FQDN comprises a top level domain name, and wherein the URL path comprises a URL file name, analyzing, using a pre-determined malicious behavior detection algorithm, the plurality of file download flows to generate a plurality of malicious indications, wherein each of the plurality of malicious indications corresponds to at least one suspicious file download flow identified from the plurality of file download flows, extracting a file download attribute from a suspicious file download flow of the plurality of file download flows, wherein the suspicious file download flow corresponds to a malicious indication of the plurality of malicious indications, wherein the file download attribute represents at least one selected from a group consisting of the URL, the FQDN, the top-level domain name, the URL path, the URL file name, and the payload of the suspicious file download flow, determining the file download attribute as being shared by at least two suspicious file download flows corresponding to at least two of the plurality of malicious indications, identifying, in response to the determining and based at least on the file download attribute, a plurality of related suspicious file download flows associated with the suspicious file download flow, determining, in response to the identifying and based at least on the file download attribute, a level of association between the suspicious file download flow and the plurality of related suspicious file download flows, computing, using a pre-determined malicious score calculation algorithm, a malicious score of the suspicious file download flow based on the level of association, and presenting the malicious score to an analyst user of the network.

Other aspects of the invention will be apparent from the following description and the appended claims.

BRIEF DESCRIPTION OF DRAWINGS

FIGS. 3.1-3.5 show various examples according to aspects of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records that form messages for the communication between the two network hosts engaged in an Internet transaction. The Internet transaction may be related to completing a task, which may be legitimate or malicious. For example, downloading malware executable file is a malicious task. For example, a flow may be identified as performing a file download based on HTTP response fields, such as Content-Type or Content-Disposition field. Each packet includes a block of data (i.e., actual packet content, referred to as payload) and supplemental data (referred to as header) containing information regarding the payload. Each flow is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Embodiments of the invention provide a method and system for detecting malicious activities in a computer network. In one or more embodiments, file download flows in a network trace are analyzed based on malicious behavior detecting algorithms to detect malicious indications. A level of association between related malicious indications is then analyzed to generate a score for a particular malicious indication. The malicious score is used to determine appropriate security measure to be initiated for mitigating malicious activities in the computer network.

Figure 1:
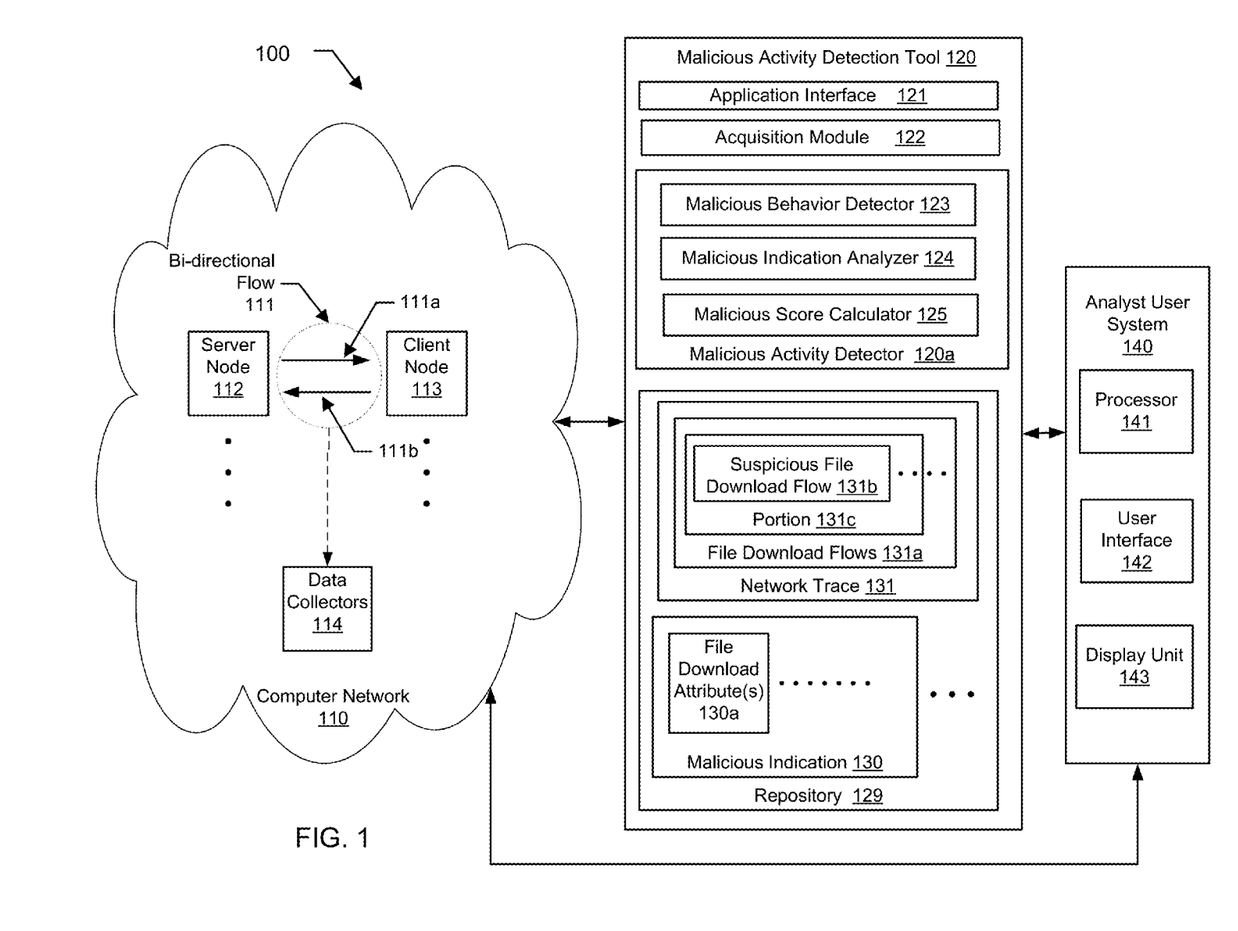
FIG. 1 shows a system block diagram according to aspects of the invention.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a malicious activity detection tool (120), a user system (140), and a computer network (110). The malicious activity detection tool (120) includes a data repository (129), an application interface (121), an acquisition module (122), and a malicious activity detector (120a), which further includes one or more of a malicious behavior detector (123), a malicious indication analyzer (124), and a malicious score calculator (125). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the computer network (110). In particular, the data collectors (114) are special type of nodes executing data collection applications.

As shown in FIG. 1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of a file download activity. For example, a file may be downloaded from the server node (112) to the client node (113). In this context, the bi-directional flow (111) and/or the uni-directional flow (111a) may be referred to as a file download flow between the server node (112) and client node (113). Generally, the file download flow is constructed according to a network protocol, such as HTTP, SMTP, game applications, chat applications, etc.

In one or more embodiments of the invention, certain device(s) (e.g., data collectors (114)) within the computer network (110) may be configured to collect network data (e.g., bi-directional flow (111), among other traffic flows) for providing to the malicious activity detection tool (120). Each of these components is described below. One of ordinary skill in the art will appreciate that embodiments are not limited to the configuration shown in FIG. 1.

In one or more embodiments of the invention, the malicious activity detection tool (120) is configured to interact with the computer network (110) using one or more of the application interface (121). The application interface (121)

may be configured to receive data (e.g., bi-directional flow (111) or a portion thereof) from the computer network (110) and/or store received data to the data repository (129). Such network data captured over a time period (e.g., an hour, a day, a week, etc.) is referred to as a trace or network trace (e.g., network trace (131)). The network trace (e.g., network trace (131)) contains network traffic data related to communications between nodes in the computer network (110). For example, the network trace (131) may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide a network trace (e.g., network trace (131)) to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious activity detection tool (120).

In one or more embodiments of the invention, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the malicious activity detection tool (120). The analyst user may include, but is not limited to, an individual, a group, an organization, or some other entity having authority and/or responsibility to access the malicious activity detection tool (120). Specifically, the context of the term "analyst user" here is distinct from that of a user of the computer network (110). The user system (140) may be, or may contain a form of, an internet-based communication device that is capable of communicating with the application interface (121) of the malicious activity detection tool (120). Alternatively, the malicious activity detection tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious activity detection tool (120) (e.g., report, alert, etc.).

As shown, communication links are provided between the malicious activity detection tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the malicious activity detection tool (120), the user system (140), and the communication links may be part of the computer network (110).

In one or more embodiments of the invention, a central processing unit (CPU, not shown) of the malicious activity detection tool (120) is configured to execute instructions to operate the components of the malicious activity detection tool (120). In one or more embodiments, the memory (not shown) of the malicious activity detection tool (120) is configured to store software instructions for analyzing the network trace (e.g., network trace (131)) to detect malicious activities. The memory may be one of a variety of memory devices, including but not limited to random access memory (RAM), read-only memory (ROM), cache memory, and flash memory. The memory may be further configured to serve as back-up storage for information stored in the data repository (129).

The malicious activity detection tool (120) may include one or more system computers, which may be implemented as a server or any conventional computing system having a hardware processor. However, those skilled in the art will appreciate that implementations of various technologies described herein may be practiced in many different computer system configurations, including multiprocessor systems, hand-held devices, networked personal computers, minicomputers, mainframe computers, and the like.

In one or more embodiments, the malicious activity detection tool (120) is configured to obtain and store data in the data repository (129). In one or more embodiments, the data repository (129) is a persistent storage device (or set of devices) and is configured to receive data from the computer network (110) using the application interface (121). The data repository (129) is also configured to deliver working data to, and receive working data from, the malicious behavior detector (123), the malicious indication analyzer (124), and the malicious score calculator (125). As shown in FIG. 1, the data repository (129) stores a collection of malicious indications, such as the malicious indication (131a). The data repository (129) may be a data store (e.g., a database, a file system, one or more data structures configured in a memory, some other medium for storing data, or any suitable combination thereof), which may include information (e.g., conversation (131), etc.) related to the network protocol analysis. The data repository (129) may be a device internal to the malicious activity detection tool (120). Alternatively, the data repository (129) may be an external storage device operatively connected to the malicious activity detection tool (120).

In one or more embodiments, the malicious activity detection tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the malicious activity detection tool (120) is configured to support various data formats provided by the user system (140).

In one or more embodiments of the invention, the malicious activity detection tool (120) includes the acquisition module (122) that is configured to obtain a network trace (e.g., network trace (131)) from the computer network (110), for example via data collectors (114). In one or more embodiments, the acquisition module (122) works in conjunction with the data collectors (114) to parse data packets and collate data packets belonging to the same flow tuple (i.e., the aforementioned 5-tuple) to form a flow (e.g., data download flow (131a) stored in the network trace (131)).

In one or more embodiments, a flow parser (e.g., acquisition module (122) in conjunction with data collectors (114) in FIG. 1) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event. In one or more embodiments, the captured flows are stored in the repository (127) as conversations. For example, the bi-directional flow (111) may be generated by a particular network application executing on the server node (112) and the client node (113). The bi-directional flow (111) is captured and stored as part of the network trace (131) to be analyzed by the malicious activity detector (120a).

In one or more embodiments of the invention, the malicious activity detection tool (120) includes the malicious behavior detector (120a) that is configured to analyze the network trace (131) for generating malicious indications (e.g., malicious indication (130)).

Specifically, in such embodiments, the malicious behavior detector (120a) is configured to identify a portion of the network trace (131) as file download flows, such as the file download flows (131a). Generally, each file download flow includes a payload that is downloaded from a server (e.g., server node (112) to a client (e.g., client node (113)) and is identified by a uniform resource locator (URL). The URL includes a fully qualified domain name (FQDN) concatenated with a URL path. The FQDN includes a top level domain name, and the URL path includes a URL file name.

In addition, in such embodiments, the malicious behavior detector (120a) is configured to analyze, using a pre-determined malicious behavior detection algorithm, the file download flows (131a) to generate malicious indications (e.g., malicious indication (130)). In one or more embodiments, each malicious indication (e.g., malicious indication (130)) corresponds to at least one suspicious file download flow (e.g., suspicious file download flow (131b)) identified from the file download flows (131a). In one or more embodiments, the pre-determined malicious behavior detection algorithm is based on one or more statistical measure of the file download flows that is associated with a malicious behavior. Specifically, in such embodiments, the malicious behavior detector (120a) is configured to calculate at least one of a file mutation measure, a domain co-location measure, a top-level domain name diversity measure, a URL path similarity measure, a URL per-domain diversity measure, a file name diversity measure, a file type diversity measure, and a file similarity measure of a portion (131c) of the file download flows (131a). For example, the portion (131c) may include the suspicious file download flow (131b). In one or more embodiments, the malicious indication (130) is generated in response to the least one measure of the portion (131c) exceeding a pre-determined threshold. In such embodiments, the malicious indication (130) corresponds to the portion (131c) and indicates that file download flows within the portion (131c) may be malicious. In other words, these file download flows are suspicious. Accordingly, consistent with naming of the suspicious file download flow (131b), each file download flow within the portion (131c) is referred to as a suspicious file download flow.

The aforementioned statistical measures represent a level of suspicious behaviors, such as hiding a location identity of a file (e.g., by changing domain identities, advertized file types, paths, names, etc., as well as represent the measures of characterizing infrastructure for file hosting (e.g., diversity of file types on a hosting infrastructure). Additional details of calculating these various statistical measures of the file download flows are described in reference to FIG. 2 below.

In one or more embodiments of the invention, the malicious activity detection tool (120) includes the malicious indication analyzer (124) that is configured to analyze file download attributes (e.g., file download attribute(s) (130a)) of all suspicious file download flows (e.g., suspicious file download flow (131b)) within the portion (131c) to determine a level of association between related suspicious file download flows identified throughout the file download flows (131a).

Figure 31:
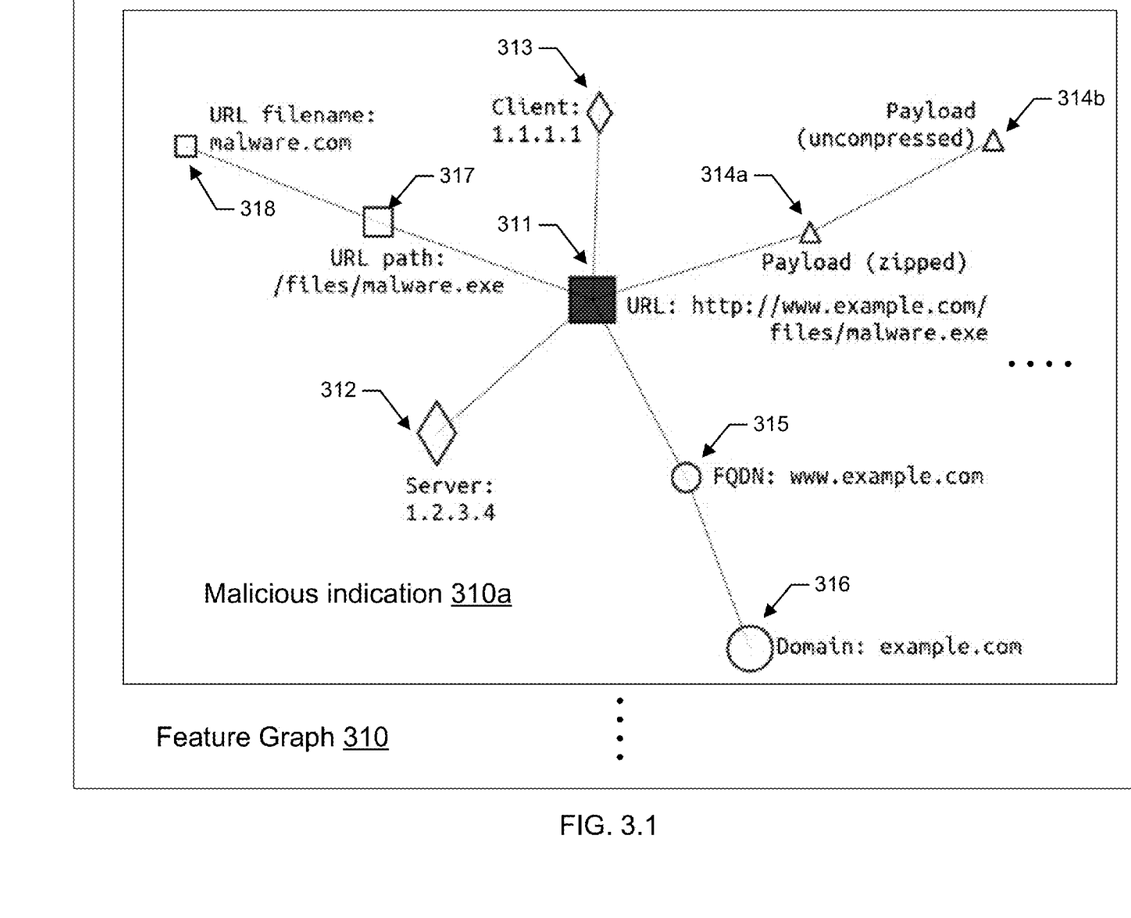

Specifically, in such embodiments, the malicious indication analyzer (124) is configured to extract one or more file download attributes from each of the suspicious file download flows corresponding to a malicious indication. For example, the file download attribute(s) (130a) may be extracted from the suspicious file download flow (131b) within the portion (131c) that corresponds to the malicious indication (130). In one or more embodiments, the file download attribute(s) (130a) represents at least one of the URL, the FQDN, the top-level domain name, the URL path, the URL file name, and the payload of the suspicious file download flow (131b). An example of the file download attribute(s) (130a) is described in reference to FIG. 3.1 below.

In addition, in such embodiments, the malicious indication analyzer (124) is configured to determine any single file download attribute (e.g., a single attribute contained in the file download attribute(s) (130a)) as being shared by at least two suspicious file download flows corresponding to at least two malicious indications. For example, a URL path contained in the file download attribute(s) (130a)) may be determined as being shared by the suspicious file download flow (131b) and another suspicious file download flow (not shown) corresponding to the malicious indication (130) and another malicious indication (not shown).

In addition, in such embodiments, the malicious indication analyzer (124) is configured to identify, in response to determining the shared file download attribute (e.g., the URL path contained in the file download attribute(s) (130a)) and based at least on the shared file download attribute, a set of related suspicious file download flows associated with the suspicious file download flow (131b). In one or more embodiments, some related suspicious file download flows may be identified within the portion (131b) where the suspicious file download flow (131b) belongs. In one or more embodiments, some related suspicious file download flows associated with the suspicious file download flow (131b) may be identified from other portion(s) of the file download flows (131). Specifically, these other portion(s) corresponds to other malicious indication(s) separate from the malicious indication (130).

In addition, in such embodiments, the malicious indication analyzer (124) is configured to determine, in response to identifying related suspicious file download flows and based at least on the shared file download attribute (e.g., the URL path contained in the file download attribute(s) (130a)), a level of association between the suspicious file download flow (131*b*) and the set of related suspicious file download flows (not shown) associated with the suspicious file download flow (131*b*).

In one or more embodiments, determining the shared file download attribute (e.g., the URL path contained in the file download attribute(s) (130*a*)), identifying related suspicious file download flows, and determining the aforementioned level of association are performed based on a feature graph representing the malicious indications, such as the malicious indication (130) among others. In such embodiments, the malicious indication analyzer (124) is configured to generate the feature graph and use the feature graph to perform the functionalities described above. Additional details of the feature graph are described in reference to FIGS. 3.1-3.5 below.

In one or more embodiments of the invention, the malicious activity detection tool (120) includes the malicious score calculator (125) that is configured to compute, using a pre-determined malicious score calculation algorithm, a malicious score of the suspicious file download flow (131*b*) based on the aforementioned level of association. Additional details of the pre-determined malicious score calculation algorithm are described in reference to FIGS. 3.1-3.5 below.

Figure 2:
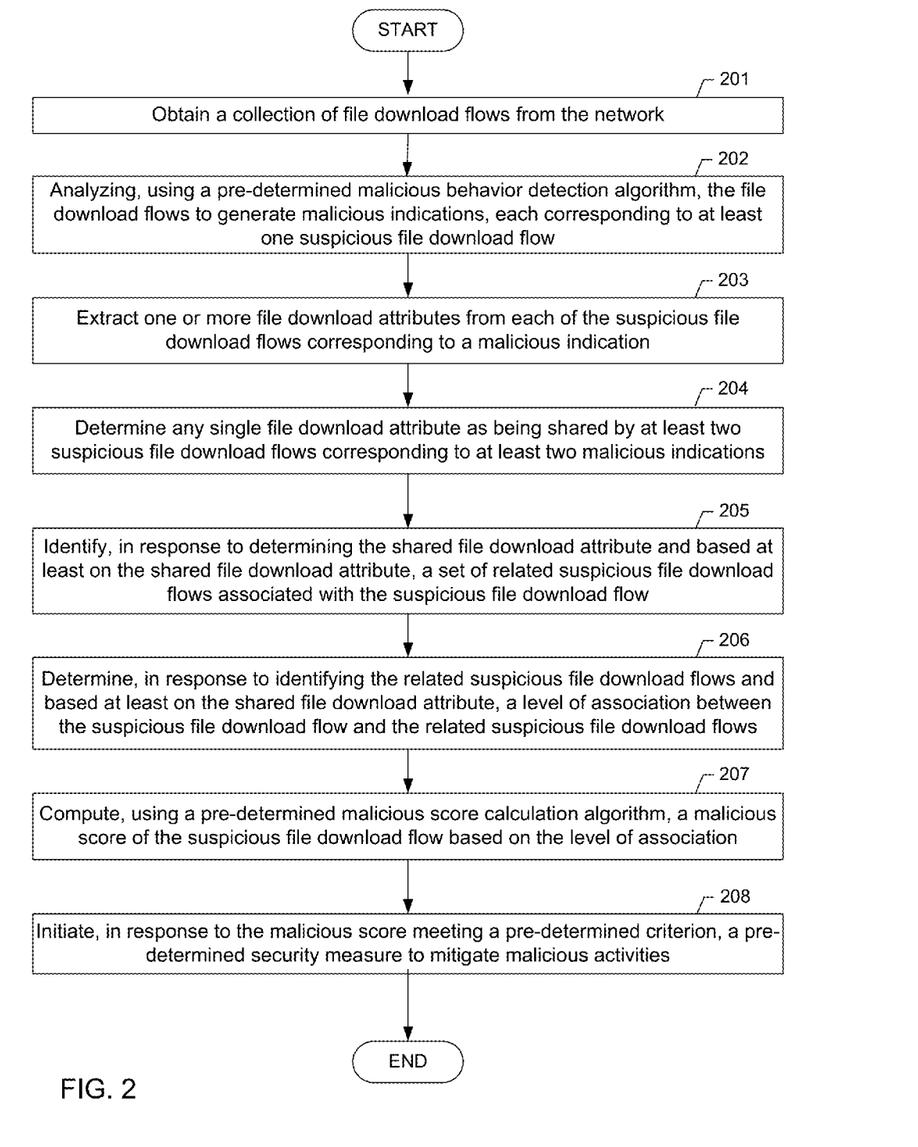
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially, in Step 201, a collection of file download flows are obtained from a network. In one or more embodiments, a network trace is analyzed to identify a portion of the network trace as file download flows. For example, a flow may be identified as a file download flow based on HTTP response fields, such as Content-Type or Content-Disposition field. Generally, each file download flow includes a payload that is downloaded from a server to a client and is identified by a uniform resource locator (URL). The URL includes a fully qualified domain name (FQDN) concatenated with a URL path. The FQDN includes a top level domain name, and the URL path includes a URL file name.

In Step 202, using a pre-determined malicious behavior detection algorithm, the file download flows are analyzed to generate malicious indications. In one or more embodiments, each malicious indication corresponds to at least one suspicious file download flow identified from the file download flows. In one or more embodiments, the pre-determined malicious behavior detection algorithm is based on one or more statistical measure of the file download flows that is associated with a malicious behavior. For example, the statistical measure includes at least one of a file mutation measure, a domain co-location measure, a top-level domain name diversity measure, a URL path similarity measure, a URL per-domain diversity measure, a file name diversity measure, a file type diversity measure, and a file similarity measure of a portion of the file download flows. In one or more embodiments, the malicious indication is generated in response to the least one measure of the portion exceeding a pre-determined threshold. In such embodiments, the malicious indication corresponds to the portion and indicates that file download flows within the portion may be malicious. In other words, these file download flows are suspicious. Accordingly, each file download flow within the portion is referred to as a suspicious file download flow.

In one or more embodiments, the pre-determined malicious behavior detection algorithm is based on the file mutation measure. The file mutation measure represents a level of attempts to bypass antivirus signatures related to file payloads, which may be used to disguise malware spreading. The signature avoidance is done by frequent software repackaging, i.e., by changing how payloads of a similar executable look. However, such mutations may not work in favor of malware distributors if they are detected. The more frequent the repackaging, the easier it avoids antivirus detection, but the more susceptible it becomes to mutation detection. In one or more embodiments, mutating payloads are detected by continually tracking file transfers that appear to be similar, i.e., the ones originating from a similar location and corresponding to a similar file name. As a parameter of mutation detection, hash values of file payloads observed at each transfer are calculated. A mutation is identified when two subsequent transfers have different hash markers. The file mutation measure represents a frequency of occurrence of mutated download files measured across a set of file download flows.

Distributed malware hosting is a strategy for malicious vendors to bypass blacklisting. Serving malware at different hosts or domains under different file names makes malicious activities much less obvious. Moreover, changing the identities of such distributed hosting further complicates detection efforts. However, given the tradeoffs of maintaining a distributed malicious infrastructure and particular interests of malware vendors, a number of indicative features are used to make detection possible.

In one or more embodiments, the pre-determined malicious behavior detection algorithm is based on the domain co-location measure. To reduce operating costs, malware vendors may serve the same malware from the same host under different domain names. The domain co-location measure represents a level of domain collocating on a single host measured across a set of file download flows.

In one or more embodiments, the pre-determined malicious behavior detection algorithm is based on the top-level domain name diversity measure. Even without co-locating domains on a single host, malware may still be spread by diversely named domains. Such setting is not common for legitimate software. The top-level domain name diversity measure represents a diversity level of top-level domain name measured across a set of file download flows.

In one or more embodiments, the pre-determined malicious behavior detection algorithm is based on the URL path similarity measure. In many cases, preserving the identities of URL paths is beneficial to malware vendors. It simplifies localization of malware and may help reduce infrastructure costs. For example, in a number of command-and-control infestations, computers are in sync with the shuffling of domain names, but preserve the same URL paths as they correspond to the directory paths at which malware is stored. The URL path similarity measure represents a similarity level of URL paths measured across a set of file download flows.

In one or more embodiments, the pre-determined malicious behavior detection algorithm is based on the URL per-domain diversity measure. Malware vendors are usually interested in pushing a comparatively small number of files from their domains. The main goal is to serve a specific malware. In contrast, legitimate software vendors usually host a large number of files, such as software updates. The URL per-domain diversity measure represents a diversity level of URLs designated for file download from each domain, as measured across a set of file download flows.

In one or more embodiments, the pre-determined malicious behavior detection algorithm is based on the file name diversity measure. File name similarity is an extension of preserving similar URL paths, with an exception that it also captures malware vendors that change locations of malware at their servers. The file name diversity measure represents a diversity level of file names used for file download from each domain, as measured across a set of file download flows.

In one or more embodiments, the pre-determined malicious behavior detection algorithm is based on the file type diversity measure. While most domains serve a number of different file types (videos, java script, HTML, Flash, etc.), malware mostly focuses on executables. The file type diversity measure represents a diversity level of file types used for file download from each domain, as measured across a set of file download flows.

In one or more embodiments, the pre-determined malicious behavior detection algorithm is based on the file similarity measure. Even when malware disguises all its origins (e.g., hosting IP address, domain name, URL path, and file name), file content still provides a hint for detection. The file similarity measure represents a similarity level of download files, as measured across a set of file download flows. For example, file hash values may be calculated and used as a means for comparing similarity among multiple files.

In Step 203, one or more file download attributes are extracted from each of the suspicious file download flows corresponding to a malicious indication. For example, the file download attribute may be extracted from the suspicious file download flow within a portion of file download flows that corresponds to the malicious indication. In one or more embodiments, the file download attribute represents at least one of the URL, the FQDN, the top-level domain name, the URL path, the URL file name, and the payload of the suspicious file download flow. An example of the file download attribute is described in reference to FIG. 3.1 below.

In Step 204, any single file download attribute shared by at least two suspicious file download flows corresponding to at least two malicious indications is detected. For example, a URL path contained in the file download attribute may be determined as being shared by two suspicious file download flows corresponding to two separate malicious indications.

In Step 205, in response to determining the shared file download attribute of a particular suspicious file download flow and based at least on the shared file download attribute, a set of related suspicious file download flows is identified as associated with the particular suspicious file download flow. In one or more embodiments, some related suspicious file download flows and the particular suspicious file download flow may correspond to the same malicious indication. In one or more embodiments, some related suspicious file download flows and the particular suspicious file download flow may correspond to separate malicious indications.

In Step 206, in response to the identifying related suspicious file download flows and based at least on the shared file download attribute, a level of association between the particular suspicious file download flow and the set of related suspicious file download flows associated with the particular suspicious file download flow is determined.

Previously described individual measures may not be able to capture maliciousness when applied individually. In one or more embodiments, individual malicious indications are combines in a feature graph such that they become more indicative of maliciousness. In one or more embodiments, determining the shared file download attribute, identifying related suspicious file download flows, and determining the aforementioned level of association are performed based on the feature graph representing multiple malicious indications.

In one or more embodiments, the feature graph includes, for each malicious indication, at least one vertex representing at least one file download attribute extracted from at least one suspicious file download flow corresponding to the malicious indication. The feature graph further includes at least two vertices representing the at least two suspicious file download flows sharing a file download attribute, and a link connecting the at least two vertices to represent sharing of the file download attribute In one or more embodiments, a link weight is assigned to the link according to a type of the file download attribute that is shared between the at least two suspicious file download flows.

In one or more embodiments, a series of links of the feature graph is traversed, starting from the particular suspicious file download flow, to identify reachable suspicious file download flows. These reachable suspicious file download flows are regarded as the related suspicious file download flows of the particular suspicious file download flow.

In one or more embodiments, the level of association (between the particular suspicious file download flow and its related suspicious file download flows) is determined based on link weights assigned to the series of links traversed to reach each related suspicious file download flow. Additional details of the feature graph and using the feature graph to identify related suspicious file download flows, and determine the aforementioned level of association are described in reference to FIGS. 3.1-3.5 below.

In Step 207, using a pre-determined malicious score calculation algorithm, a malicious score of the particular suspicious file download flow is computed based on the level of association between the particular suspicious file download flow and its related suspicious file download flows.

Additional details of computing the malicious score are described in reference to FIGS. 3.1-3.5 below.

In Step 208, in response to the malicious score meeting a pre-determined criterion, a pre-determined security measure is initiated to mitigate malicious activities. In one or more embodiments, the appropriate security measure is initiated automatically when the malicious score exceeds a preset threshold. In one or more embodiments, the malicious score is presented to an analyst user monitoring the network, who may initiate an appropriate security measure. For example, network traffic may be selectively blocked from a malicious client/server nodes or a URL path.

FIGS. 3.1-3.5 show various feature flow examples in accordance with aspects of the invention. As described above, once individual malicious indications are identified from file download flows, a feature graph is generated to combine individual malicious indications and provide a broader view of a potential malware. For example, seeing two download files with similar names at different domains produces some suspicion, which in itself cannot be mapped to malware. However, if the feature graph adds other malicious indications, such as the two download files frequently mutate and are similar, the confidence in their malicious nature becomes higher. In one or more embodiments, the feature graph is heterogeneous. Its vertices correspond to download locations and attributes of suspicious executable files observed in the traffic. Specifically, a vertex can be an IP address, a domain name, a fully qualified domain name, a URL path, a complete URL, a file name, or a file identity hash. The links/edges of the feature graph represent connections between the vertices as observed in the traffic.

FIG. 3.1 shows an example feature graph (310) in a schematic view, detailing file download attributes of a single file download where the file (having payload (314a) and/or (314b)) is found at an URL http://www.example.com/files/ malware.exe (having FQDN (315), top-level domain (316), URL path (317), and URL file name (318)), sourced at the server (312) with IP address 1.2.3.4, and downloaded to the client (313) with IP address 1.1.1.1. Each of these file download attributes is represented by a particularly shaped icon, which is used to identify the corresponding type of file download attribute throughout FIGS. 3.1-3.5. Throughout FIGS. 3.1-3.5, the term "domain" is used to refer to a top-level domain name.

As shown in FIG. 3.1, this single file download may be part of a single malicious indication (310a) generated at a point in time. Propagating from this single malicious indication (310), the feature graph (310) may be expanded in stages by adding a new component (link or vertex) when additional malicious indications are generated from the network trace as time progress.

Figure 32:
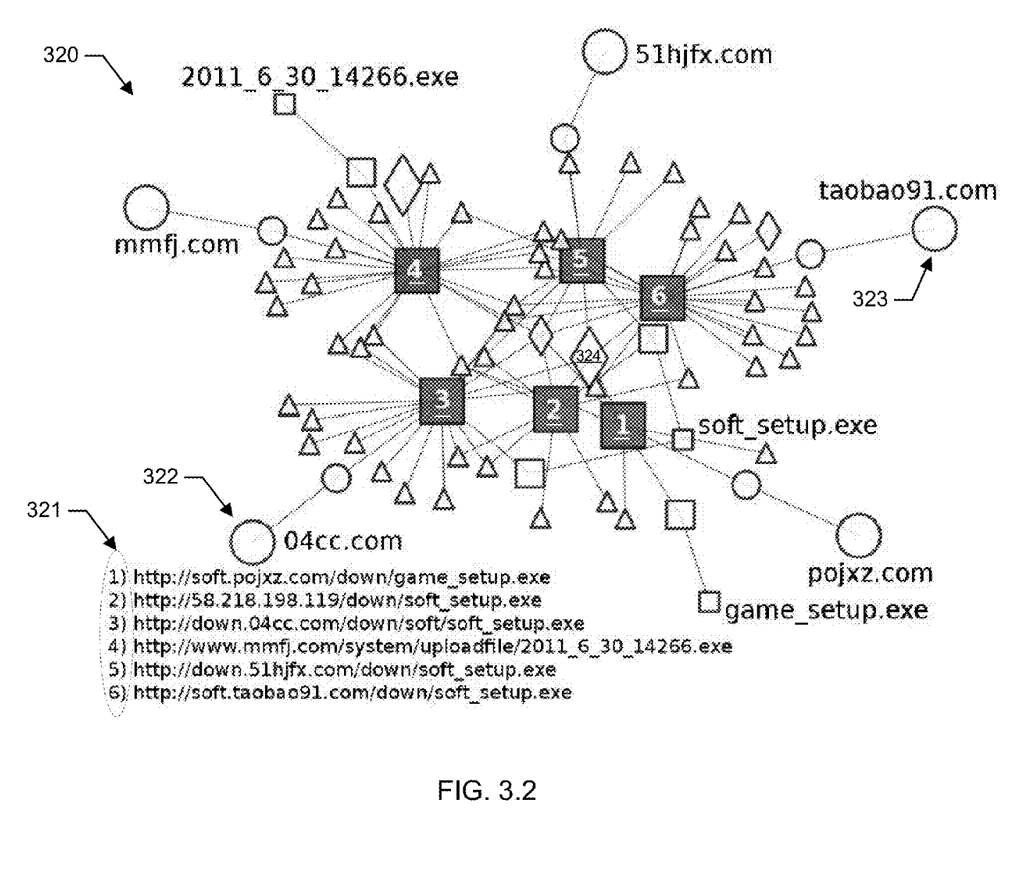

FIG. 3.2 shows an example feature graph (320) in a detailed view. As shown in FIG. 3.2, the feature graph (320) includes six URLs (i.e., URL (1) through URL (6) labeled according to the list (321)) that are found from numerous file download flows represented by the icons in smaller and larger square shape, triangular shape, smaller and larger diamond shapes, and smaller and larger circular shapes. Each of these different shaped icons represents one of the file download attributes shown in FIG. 3.1 above. As an example, the feature graph (320) may have initially been seeded by a domain (322) "04cc.com." Subsequently, another malicious indication is generated in response to detecting that another domain (323) "taobao91.com" is hosted at the same server (324). Accordingly, the domain (323) and other associated file download attributes (e.g., URL (6)) are also added into the feature graph (320). As time further progresses, additional new elements are added to the feature graph (320) until either there is no more updating data or the feature graph (320) reaches a pre set maximum size (e.g., 2,000 nodes). At this point, the feature graph (320) is considered sufficient to make a decision regarding maliciousness.

As described above, once a feature graph is generated, a malicious score is computed on the following principle: "the closer a graph vertex is to a confirmed malicious neighbor, the more the vertex's malicious suspicion increases." Thus, the malicious score of a vertex may be computed based on the shortest path distances to related vertices. In one or more embodiments, different neighboring relations are assigned different link weights, depending how the type of neighboring relationship implying malicious suspicion of one end of the link based on the known malicious status of the other end of the link. For example, three different values of link weights may be assigned to different types of links as below:

URL <-> payload: link weight=1
URL <-> URL_path: link weight=2
URL_path <-> URL_filename: link weight=2
URL <-> FQDN: link weight=2
FQDN <-> domain: link weight=2
URL <-> server: link weight=1
URL <-> client: link weight=4

Figure 33:
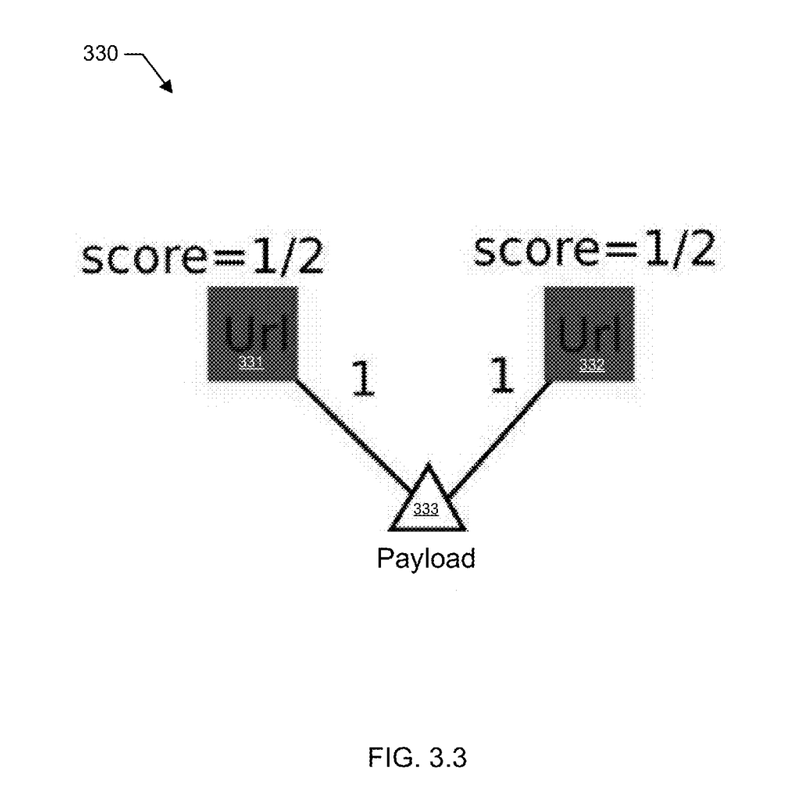

As an example, the malicious score of a particular URL in the feature graph may be calculated as the sum of the inverse of the link weight over all related URLs reachable by traversing the feature graph from the particular URL. In other words, the algorithm to calculate the malicious score of the particular URL in the feature graph may be represented by the following pseudo-code:

u=the particular URL
s=empty list
for every other URL v in the feature graph:
  a. s.append(find_distance_of_shortest_path_in_graph(u, v))
  b. score=0 for element in s:
  c. score+=1/s FIG. 3.3 shows a simplified feature graph (330) having two URLs (i.e., Url (331) and Url (332)) that have nothing in common except that they provide the same payload (333) to a client. According to the example link weights assignment above, the link weight of each links in the feature graph (330) is 1. The distance of the shortest path between these two URLs is 2. According to the example pseudo-code above, the malicious score is ½ for each of the Url (331) and Url (332).

Figure 34:
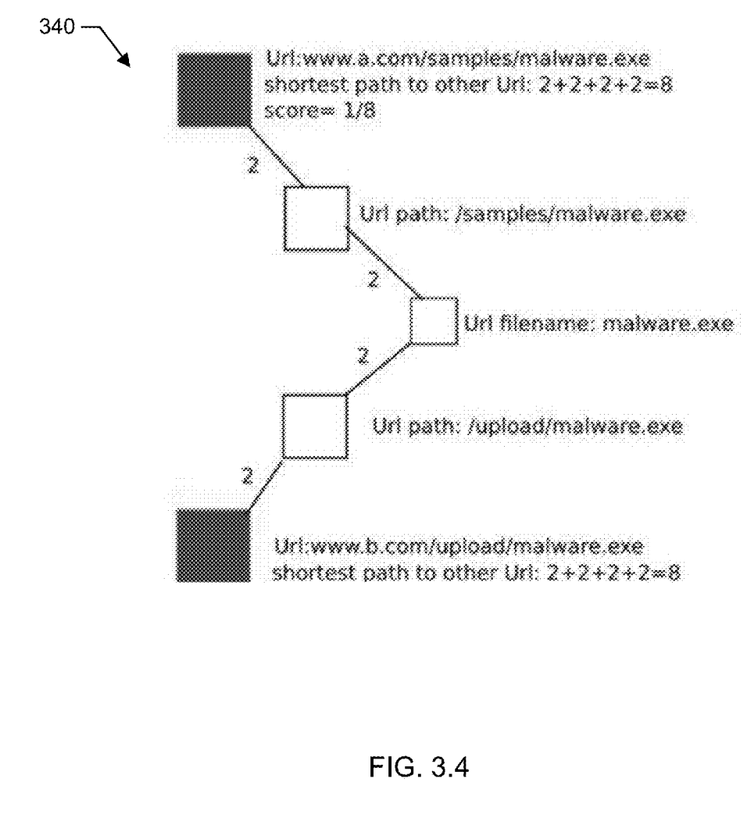
Figure 35:
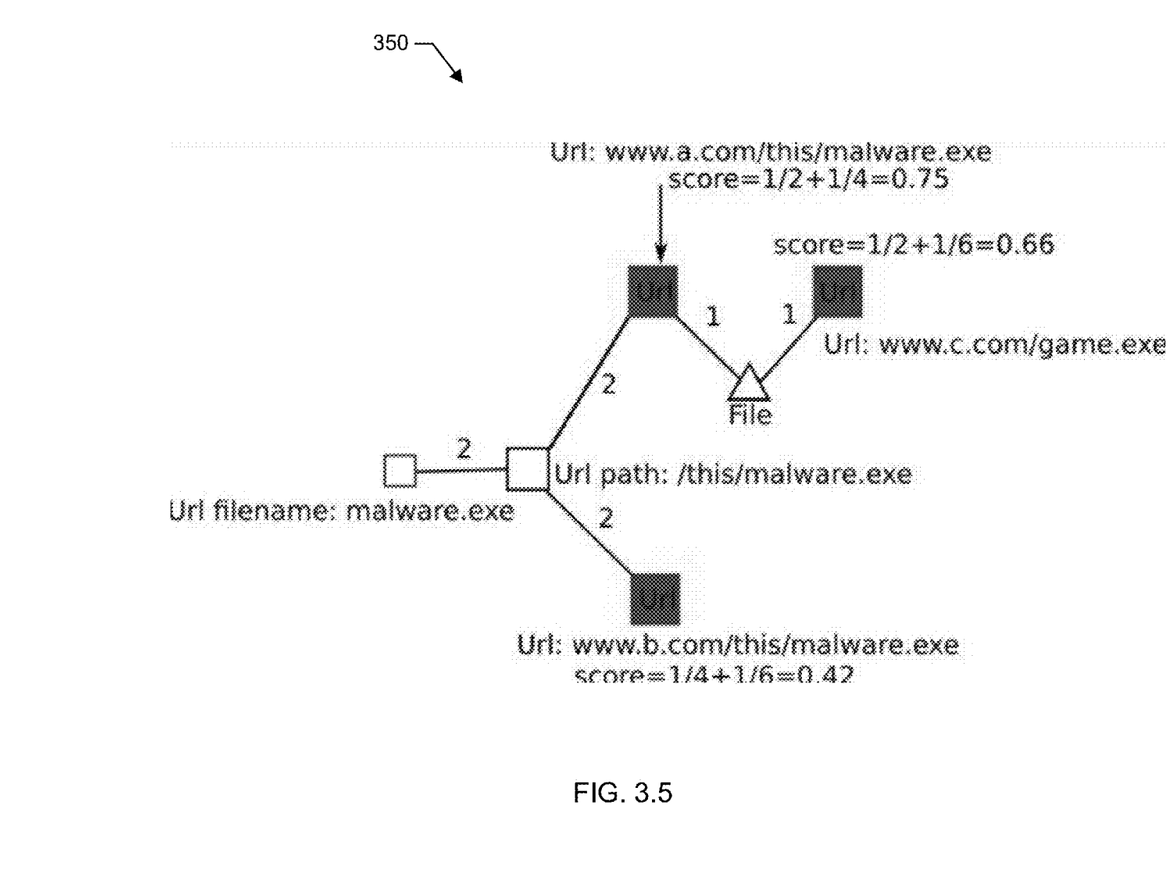

FIGS. 3.4-3.5 shows additional example feature graph (340) and (350), respectively, where malicious scores are computed using the example algorithm above.

Figure 4:
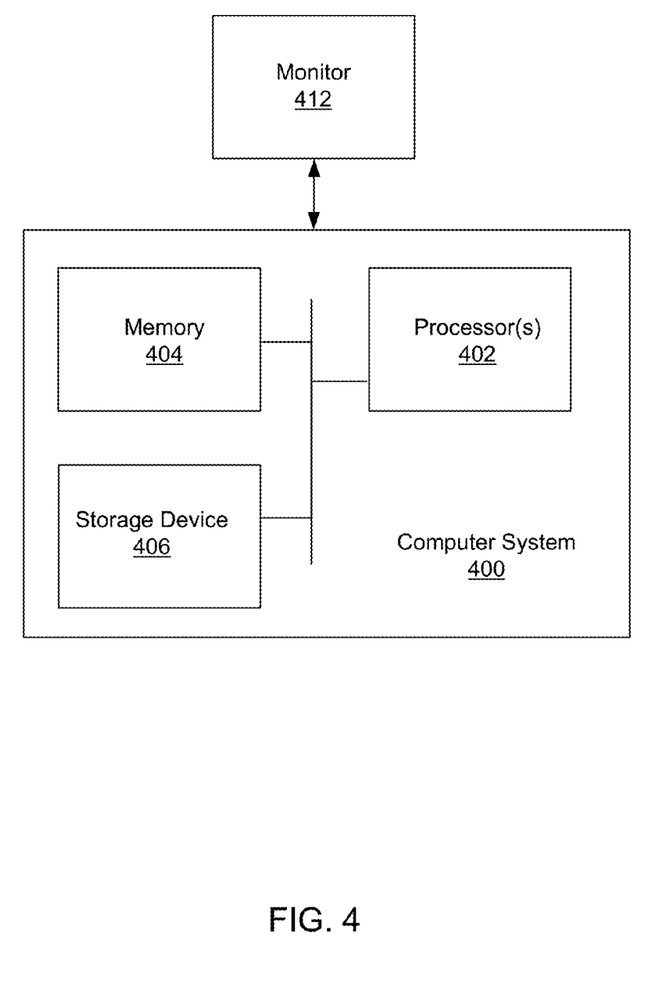
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (not shown), a mouse (not shown), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network (not shown). Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a malicious activity in a network, comprising:

obtaining a plurality of file download flows from the network, wherein each of the plurality of file download flows comprises a payload that is downloaded from a server to a client and is identified by a uniform resource locator (URL), wherein the URL comprises a fully qualified domain name (FQDN) concatenated with a URL path, wherein the FQDN comprises a top level domain name, and wherein the URL path comprises a URL file name; analyzing, by a computer processor and using a pre-determined malicious behavior detection algorithm, the plurality of file download flows to generate a plurality of malicious indications, wherein each of the plurality of malicious indications corresponds to at least one suspicious file download flow identified from the plurality of file download flows;

extracting a file download attribute from a suspicious file download flow of the plurality of file download flows, wherein the suspicious file download flow corresponds to a malicious indication of the plurality of malicious indications, wherein the file download attribute represents at least one selected from a group consisting of the URL, the FQDN, the top-level domain name, the URL path, the URL file name, and the payload of the suspicious file download flow;

determining the file download attribute as being shared by at least two suspicious file download flows corresponding to at least two of the plurality of malicious indications;

identifying, in response to the determining and based at least on the file download attribute, a plurality of related suspicious file download flows associated with the suspicious file download flow;

determining, in response to the identifying and based at least on the file download attribute, a level of association between the suspicious file download flow and the plurality of related suspicious file download flows;

computing, by the computer processor and using a pre-determined malicious score calculation algorithm, a malicious score of the suspicious file download flow based on the level of association, wherein a security measure is initiated, based at least on the malicious score, to mitigate the malicious activity;

generating a feature graph to represent the plurality of malicious indications;

wherein the feature graph further comprises a link weight assigned to the link according to a type of the file download attribute; and traversing a plurality of links of the feature graph to identify the plurality of related suspicious file download flows, wherein the level of association is determined based on a plurality of link weights assigned to the plurality of links, the plurality of links comprising the link and the plurality of link weights comprising the link weight, and wherein the malicious score is computed based on the plurality of link weights.

2. The method of claim 1, further comprising:

wherein the feature graph comprises, for each of the plurality of malicious indications, at least one vertex representing at least one file download attribute extracted from the at least one suspicious file download flow, wherein the feature graph further comprises at least two vertices representing the at least two suspicious file download flows, respectively, and a link connecting the at least two vertices to represent sharing of the file download attribute by the at least two suspicious file download flows.

3. The method of claim 1, wherein analyzing the plurality of file download flows comprises:

calculating at least one measure from a group consisting of a file mutation measure, a domain co-location measure, a top-level domain name diversity measure, a URL path similarity measure, a URL per-domain diversity measure, file name diversity measure, file type diversity measure, and file similarity measure of a portion of the plurality of file download flows, wherein the portion comprises the suspicious file download flow; and wherein the malicious indication is generated in response to the least one measure of the portion exceeding a pre-determined threshold.

4. A system for detecting a malicious node in a network, comprising:

a processor;

memory storing instructions executable by the processor, wherein the instructions when executed by the processor comprises:

a malicious behavior detector configured to:

obtain a plurality of file download flows from the network, wherein each of the plurality of file download flows comprises a payload that is downloaded from a server to a client and is identified by a uniform resource locator (URL), wherein the URL comprises a fully qualified domain name (FQDN) concatenated with a URL path, wherein the FQDN comprises a top level domain name, and wherein the URL path comprises a URL file name; and analyze, using a pre-determined malicious behavior detection algorithm, the plurality of file download flows to generate a plurality of malicious indications, wherein each of the plurality of malicious indications corresponds to at least one suspicious file download flow identified from the plurality of file download flows;

a malicious indication analyzer configured to:

extract a file download attribute from a suspicious file download flow of the plurality of file download flows, wherein the suspicious file download flow corresponds to a malicious indication of the plurality of malicious indications, wherein the file download attribute represents at least one selected from a group consisting of the URL, the FQDN, the top-level domain name, the URL path, the URL file name, and the payload of the suspicious file download flow;

determine the file download attribute as being shared by at least two suspicious file download flows corresponding to at least two of the plurality of malicious indications;

identify, in response to the determining and based at least on the file download attribute, a plurality of related suspicious file download flows associated with the suspicious file download flow; and determine, in response to the identifying and based at least on the file download attribute, a level of association between the suspicious file download flow and the plurality of related suspicious file download flows; and a malicious score calculator configured to:

compute, using a pre-determined malicious score calculation algorithm, a malicious score of the suspicious file download flow based on the level of association; and a repository configured to store the plurality of malicious indications, wherein a security measure is initiated, based at least on the malicious score, to mitigate the malicious activity;

generate a feature graph to represent the plurality of malicious indications;
wherein the feature graph further comprises a link weight assigned to the link according to a type of the file download attribute; and
traverse a plurality of links of the feature graph to identify the plurality of related suspicious file download flows,
wherein the level of association is determined based on a plurality of link weights assigned to the plurality of links, the plurality of links comprising the link and the plurality of link weights comprising the link weight, and
wherein the malicious score is computed based on the plurality of link weights.

5. The system of claim 4, the malicious indication analyzer further configured to:
wherein the feature graph comprises, for each of the plurality of malicious indications, at least one vertex representing at least one file download attribute extracted from the at least one suspicious file download flow,
wherein the feature graph further comprises at least two vertices representing the at least two suspicious file download flows, respectively, and a link connecting the at least two vertices to represent sharing of the file download attribute by the at least two suspicious file download flows.

6. The system of claim 4, wherein analyzing the plurality of file download flows comprises:
calculating at least one measure from a group consisting of a file mutation measure, a domain co-location measure, a top-level domain name diversity measure, a URL path similarity measure, a URL per-domain diversity measure, file name diversity measure, file type diversity measure, and file similarity measure of a portion of the plurality of file download flows, wherein the portion comprises the suspicious file download flow; and
wherein the malicious indication is generated in response to the least one measure of the portion exceeding a pre-determined threshold.

7. A non-transitory computer readable medium embodying instructions for detecting a malicious activity in a network, the instructions when executed by a processor comprising functionality for:
obtaining a plurality of file download flows from the network, wherein each of the plurality of file download flows comprises a payload that is downloaded from a server to a client and is identified by a uniform resource locator (URL), wherein the URL comprises a fully qualified domain name (FQDN) concatenated with a URL path, wherein the FQDN comprises a top level domain name, and wherein the URL path comprises a URL file name;
analyzing, using a pre-determined malicious behavior detection algorithm, the plurality of file download flows to generate a plurality of malicious indications, wherein each of the plurality of malicious indications corresponds to at least one suspicious file download flow identified from the plurality of file download flows;
extracting a file download attribute from a suspicious file download flow of the plurality of file download flows, wherein the suspicious file download flow corresponds to a malicious indication of the plurality of malicious indications, wherein the file download attribute represents at least one selected from a group consisting of the URL, the FQDN, the top-level domain name, the URL path, the URL file name, and the payload of the suspicious file download flow;
determining the file download attribute as being shared by at least two suspicious file download flows corresponding to at least two of the plurality of malicious indications;
identifying, in response to the determining and based at least on the file download attribute, a plurality of related suspicious file download flows associated with the suspicious file download flow;
determining, in response to the identifying and based at least on the file download attribute, a level of association between the suspicious file download flow and the plurality of related suspicious file download flows;
computing, using a pre-determined malicious score calculation algorithm, a malicious score of the suspicious file download flow based on the level of association,
wherein a security measure is initiated, based at least on the malicious score, to mitigate the malicious activity;
generating a feature graph to represent the plurality of malicious indications;
wherein the feature graph further comprises a link weight assigned to the link according to a type of the file download attribute; and
traversing a plurality of links of the feature graph to identify the plurality of related suspicious file download flows,
wherein the level of association is determined based on a plurality of link weights assigned to the plurality of links, the plurality of links comprising the link and the plurality of link weights comprising the link weight, and
wherein the malicious score is computed based on the plurality of link weights.

8. The non-transitory computer readable medium of claim 7, further comprising:
wherein the feature graph comprises, for each of the plurality of malicious indications, at least one vertex representing at least one file download attribute extracted from the at least one suspicious file download flow,
wherein the feature graph further comprises at least two vertices representing the at least two suspicious file download flows, respectively, and a link connecting the at least two vertices to represent sharing of the file download attribute by the at least two suspicious file download flows.

9. The non-transitory computer readable medium of claim 7, wherein analyzing the plurality of file download flows comprises:
calculating at least one measure from a group consisting of a file mutation measure, a domain co-location measure, a top-level domain name diversity measure, a URL path similarity measure, a URL per-domain diversity measure, file name diversity measure, file type diversity measure, and file similarity measure of a portion of the plurality of file download flows, wherein the portion comprises the suspicious file download flow; and
wherein the malicious indication is generated in response to the least one measure of the portion exceeding a pre-determined threshold.

* * * * *